United States Patent [19]

Fujii et al.

[11]  4,454,306

[45]  Jun. 12, 1984

[54] OLEFINIC BLOCK COPOLYMER AND CROSSLINKED PRODUCT THEREOF

[75] Inventors: Masaki Fujii; Mitsutaka Miyabayashi, both of Yokkaichi, Japan

[73] Assignee: Mitsubishi Petrochemical Company, Ltd., Tokyo, Japan

[21] Appl. No.: 409,834

[22] Filed: Aug. 20, 1982

[30] Foreign Application Priority Data

| Aug. 20, 1981 [JP] | Japan | 56-130730 |
| Dec. 15, 1981 [JP] | Japan | 56-202059 |
| Mar. 23, 1982 [JP] | Japan | 57-45799 |
| Apr. 27, 1982 [JP] | Japan | 57-69629 |

[51] Int. Cl.$^3$ ................. C08F 293/00; C08L 53/00
[52] U.S. Cl. .................... 525/323; 525/313; 525/321
[58] Field of Search ................ 525/321, 323

[56] References Cited

U.S. PATENT DOCUMENTS 4,334,040  6/1982  Fujii et al. ................ 525/323

FOREIGN PATENT DOCUMENTS

| 48-21731 | 3/1973 | Japan | 525/323 |
| 994416 | 6/1965 | United Kingdom | 525/323 |

*Primary Examiner*—Wilbert J. Briggs, Sr.
*Attorney, Agent, or Firm*—Oblon, Fisher, Spivak, McClelland & Maier

[57] ABSTRACT

A crosslinked product is derived from an olefinic block copolymer comprising 5 to 70 parts by weight of at least one block (A), which is selected from homopolymer blocks of propylene and random copolymer blocks of propylene and ethylene or a $C_{4-12}$ α-olefin and has a propylene content of 60 to 100% by weight, and 30 to 95 parts by weight of at least one block (B), which is a random copolymer of ethylene and at least one $C_{3-12}$ α-olefin and has an ethylene content of 10 to 85% by weight. This crosslinked product is characterized in that:

(1) the content therein of hot xylene insoluble components is from 5 to 75% by weight; and
(2) the fluidity thereof, i.e., the quantity thereof flowing per second (cc/sec.$\times 10^{-3}$) out through the orifice of Koka flow tester, is 3 to 500 cc/sec.$\times 10^{-3}$ when measured by this flow tester having a cylinder diameter of 10 mm, an orifice diameter of 1 mm, and an orifice height of 2 mm and operated with a load of 30 Kg and a temperature of the crosslinked product of 200° C.

7 Claims, No Drawings

OLEFINIC BLOCK COPOLYMER AND CROSSLINKED PRODUCT THEREOF

BACKGROUND OF THE INVENTION

This invention relates to an olefinic block copolymer having excellent well-balanced flexibility, strength and processability and also to a partially crosslinked product derived from this copolymer and having excellent heat resistance and set property.

In recent years, soft materials having excellent heat resistance (particularly form retention against external forces at high temperatures) and strength have been developed for automobile parts, domestic electrical article parts, coating materials of electrical cables, pipes, etc. These materials have physical properties which are comparable to or approximate those of vulcanized rubbers and yet also possess moldability which is deficient in vulcanized rubbers. For this reason, these materials are now found to have created one field of materials as thermoplastic elastomers. Particularly polyolefinic thermoplastic elastomers, differing from other polystyrene type or polyester type elastomers which are obtained by block copolymerization of hard segments and soft segments, have been investigated primarily with respect to kneaded products of polyolefinic resins as hard segments (e.g., polypropylene, polyethylene, poly(ethylene-vinyl acetate) and others) and polyolefinic rubbers as soft segments and also sometimes with respect to products of which the rubber portions are partially crosslinked during kneading. Practical developments have been made mainly by the use of a system of poly(ethylene-propylene) type rubber/polypropylene type resin, as disclosed in Japanese Patent Laid-open Publication No. 53938/74. However, these materials are accompanied by the problem in their manufacturing process of requiring an additional step of fusion kneading of both components, whereby the cost is increased to a great extent to hamper expansion of the demand. In addition, there is also the problem of quality, because molecular designs of both components have not heretofore been sufficiently investigated with respect to the characteristics to be possessed by the thermoplastic elastomers. In particular, these materials of the prior art were not satisfactory with respect to the balance between flexibility, strength, and moldability, and also with respect to heat resistance and the balance between reduced permanent-set tendency and moldability in the case of crosslinked thermoplastic elastomers.

SUMMARY OF THE INVENTION

An object of the present invention is to overcome the drawbacks possessed by the polyolefinic thermoplastic elastomers of the prior art. This and other objects have been achieved by providing a crosslinked product derived from a copolymer having a specific composition and physical properties.

More specifically, the crosslinked product of an olefinic block copolymer according to the present invention is characterized by being derived from an olefinic block copolymer comprising 5 to 70 parts by weight of at least one block (A), which is selected from homopolymer blocks of propylene and random copolymer blocks of propylene and ethylene or an α-olefin of $C_{4-12}$ and has a propylene content of 60 to 100% by weight, and 30 to 95 parts by weight of at least one block (B), which is a random copolymer of ethylene and at least one α-olefin of $C_{3-12}$ and has an ethylene content of 10 to 85% by weight, and having specific features (1) and (2) as defined below:

(1) the content therein of hot xylene insoluble components is from 5 to 75% by weight; and (2) the fluidity thereof, which is a quantity thereof flowing per second out from the orifice in cc/sec. $\times 10^{-3}$, measured by means of a Koka flow tester under the following conditions is 3 to 500:

Cylinder diameter: 10 mm$\phi$
Orifice diameter: 1 mm$\phi$
Orifice height: 2 mm$\phi$
Load: 30 Kg
Temperature of the crosslinked product: 200° C.

The crosslinked olefinic block copolymers possess insolubility in hot xylene which reflects the degree of crosslinking and fluidity which reflects formability both referred to above, and further possess flexibility in terms of Olsen flexural stiffness (10° angle) at a level of 6000 $Kg/cm^2$ or lower, tensile strength at a level of 40 $Kg/cm^2$ or higher, heat resistance in terms of deformation under heat and pressure of a level of 20% or lower, good impact strength at a temperature of −20° C. to −40° C. and good permanent elongation.

The crosslinked products in accordance with the present invention have utility in automobile parts, domestic electrical article parts, coating materials of electric cables, pipes, tubes and hoses.

DETAILED DESCRIPTION OF THE INVENTION

1. Block copolymer (1) Composition:

Throughout the following disclosure, quantities (amounts) expressed in percent (%) and part(s) are by weight unless otherwise specified.

The block copolymer according to the present invention comprises one or more of block (A), which is selected from homopolymer blocks of propylene and random copolymer blocks of propylene and ethylene or an α-olefin of $C_{4-12}$ and has a propylene content of 60 to 100%, and one or more of block (B), which is selected from random copolymers of ethylene and α-olefin of $C_{3-12}$ and has an ethylene content of 10 to 85%.

The block copolymer according to the present invention is not limited to one containing only one each of the blocks (A) and (B), but it also includes those each containing plural number of one or both of the blocks. There is also no limitation with respect to the sequence of respective blocks. Co-presence of other blocks is also possible, so long as the blocks (A) and (B) occupy at least 50% of the whole copolymer.

The block (A) refers to the portion formed by homopolymerization of propylene or by polymerization conducted under the condition where propylene and ethylene and/or a $C_{4-12}$ α-olefin are present at the same time. The block (B) refers to the portion formed by polymerization conducted under the condition where ethylene and a $C_{3-12}$ α-olefin are present at the same time. Either (A) or (B) may be formed first. When a plural number of (A) or/and (B) blocks are contained, it is not necessarily required that individual (A) blocks or (B) blocks have the same composition or molecular weight.

Such a block copolymer can be prepared by carrying out stepwise polymerizations of the desired monomers so as to form respective blocks successively (as described hereinafter). Provided that such a production method is employed, the block copolymer of the present invention will assume a structure wherein a homopolymer block and a random copolymer block, or a random copolymer block with a certain composition and another random copolymer block with a different composition are co-present in one polymeric molecular chain, or which is a physical mixture of both molecular chains or is a mixture of these.

The block copolymer of the present invention comprises 5 to 70 parts, preferably 10 to 65 parts, more preferably 15 to 60 parts of one or more of the block (A) and 30 to 95 parts, preferably 35 to 90 parts, more preferably 40 to 85 parts of one or more of the block (B). The block (A) is the portion having the characteristic of a crystalline thermoplastic resin, while the block (B) is the portion having the characteristic of an amorphous to low crystalline elastomer. Therefore, at a lower content of (A) than said range, strength and moldability are lowered, whereby moldability of a partially crosslinked product will also be worsened as described hereinafter. On the other hand, when the content of (A) exceeds the above range, no flexibility can be exhibited.

The content of propylene in the block (A) may be about 60 to 100%, preferably 70 to 100%, more preferably 75 to 100%. Since the block (A) is required to be a crystalline thermoplastic plastic element, a propylene content lower than said range will undesirably lower the crystallinity of the block. In particular, in the case of copolymerization of propylene and ethylene, a preferred propylene content is 92 to less than 97%, more preferably 92 to less than 95%. When propylene is to be copolymerized with butene-1, a preferable propylene content is 75% to 85%. It is also preferred to employ a propylene content of 85% to 92%, in the case of copolymerization of propylene with a $C_{5-12}$ α-olefin. Propylene may be either subjected to homopolymerization or copolymerized with ethylene or a $C_{4-12}$ α-olefin. Examples of monomers falling within the category of the latter are straight-chain α-olefins such as butene-1, pentene-1, hexane-1, heptene-1, octene-1, nonene-1, decene-1, undecene-1 and dodecene-1, and branched α-olefins such as 3-methyl-butene-1, 3-methyl-pentene-1, 3-ethylpentene-1, 3-methylhexene-1, 4-methyl-pentene-1, 4,4-dimethylpentene-1, 4-methylhexene-1, 5-methylhexene-1, 5,5-dimethylhexene-1, 3,5-dimethylhexene-1, and 3,5,5-trimethylhexene-1.

Preferable among these comonomers are ethylene, butene-1, hexene-1 and 4-methylpentene-1. Particularly, ethylene, butene-1 and hexene-1 are preferred.

The block (B) is a random copolymer of ethylene and a $C_{3-12}$ α-olefin. In any case, the ethylene content in the block (B) is of the order of 10 to 85%, preferably 15 to 75%, more preferably 17 to 70%. Since the block (B) is required to have an elastomeric property ranging from amorphous to very low crystalline, an ethylene content in excess of this range will undesirably increase the crystallinity of the block. On the other hand, with an ethylene content lower than this range, the following problems will ensue depending on the type of the comonomer to be combined. When the comonomer is one which can itself form a crystalline homopolymer, such as butene-1, 4-methylpentene-1, the block (B) will be too highly crystalline at a lower ethylene content than this range. On the other hand, when the comonomer is one which can itself form a liquid homopolymer at room temperature, the strength of the block (B) will excessively be lowered. The impact strength at lower temperatures will also be inferior when the ethylene content is lower than this range. In particular, when the impact strength at lower temperatures is considered to be important, it is desirable that the ethylene content in the block B be more than 30% up to 85%, preferably 35 to 75%, more preferably 40 to 70%. On the other hand, when the transparency is considered to be important, it is desirable that the ethylene content in the block B be 10 to 30%, preferably 15 to 28%, more preferably 17 to 26%.

For the same reasons, the ethylene content in the final copolymer should be more than 3%, preferably 6% or more, more preferably 8% or more. Particularly, when a high impact strength at lower temperatures is desired, the ethylene content in the final copolymer should exceed 15%, preferably 17.5% or more, more preferably 20% or more. The upper limit is generally 81%, preferably 70%. Particularly, when, above all, transparency is required, the upper limit should be 30%, preferably 20%.

The comonomer to be combined with ethylene in the block (B) is selected from $C_{3-12}$ α-olefins. Propylene is particularly preferred from the standpoint of cost. In order to maintain a better balance between strength and flexibility, $C_{4-12}$ α-olefins are preferred. Further, in view of the balance between the cost and physical properties such as strength, a part of $C_{4-12}$ α-olefins may be replaced by propylene, usually in less than half amount based on the weight.

The copolymers to be provided for the crosslinked product of the present invention may be classified into the five categories set forth below:

(1) An olefin copolymer, comprising 5 parts or more and less than 50 parts of one or more of block (A), which is selected from homopolymer blocks of propylene and binary random copolymer blocks of propylene and ethylene or a $C_{4-12}$ α-olefin and contains 60 to 100% of propylene, and more than 50 and not more than 95 parts of one or more of block (B), which is a binary or ternary copolymer of ethylene and a $C_{4-12}$ α-olefin optionally with propylene and contains more than 30 and not more than 85% of ethylene.

Crosslinked products produced with the use of this polymer exhibit the physical properties of a flexibility of 2,000 Kg/cm² or less in terms of Olsen flexural modulus (10° angle); a tensile strength of 50 Kg/cm² or more (measured by the method described hereinafter); a heat resistance of 20% or less in terms of deformation degree under heat and pressure; a permanent set of 35% or less (measured by the method described hereinafer); and a low temperature impact strength of 20 Kg-cm/cm² or more in terms of Charpy impact strength at −40° C. (measured by the method described hereinafter). These products are useful for fabricating automobile parts such as bumpers, electrical cable coatings, etc.

(2) An olefin copolymer, comprising 5 to 50 parts of one or more of block (A), which is selected from homopolymer blocks of propylene and binary random copolymer blocks of propylene and ethylene or a $C_{4-12}$ α-olefin and contains 100 to 60% of propylene, and 95 to 50 parts of one or two or more of block (B), which is a binary copolymer of ethylene and propylene and contains 30 to 85% of ethylene.

Crosslinked products produced with the use of this polymer exhibit the physical properties of a flexibility of 3,500 Kg/cm² or less in terms of Olsen flexural modulus (10° angle); a tensile strength of 40 Kg/cm² or more (measured by the method as described hereinafter); a heat resistance of 20% or less; a permanent set of 50% or less, preferably 35% or less (measured by the method described hereinafter); and a low temperature impact strength of 20 Kg-cm/cm² or more in terms of Charpy impact strength at −40° C. (measured by the method described hereinafter). These products are useful for fabricating automobile parts such as bumpers, electrical cable coatings, parts for domestic electrical articles, etc.

(3) An olefinic copolymer, comprising 5 to 70 parts of a block (A), which is selected from homopolymer blocks of propylene and binary or ternary random copolymer blocks of propylene and ethylen and/or butene-1 containing 70 to 100% of propylene, 0 to 8% of ethylene and 0 to 30% of butene-1, and 30 to 95 parts of block (B), which is a ternary random copolymer comprising 0 to 85% of butene-1, 5 to 90% of propylene and 10 to 30% of ethylene.

Crosslinked products comprising this polymer have the physical properties of a flexibility of 5,000 Kg/cm² or less, more narrowly 4,000 Kg/cm² or less, in terms of Olsen flexural modulus (10° angle); a tensile strength of 50 Kg/cm² or more (measured by the method described hereinafter); a heat resistance in terms of deformation degree under heat and pressure of 20% or less; and a low temperature impact strength of 5 Kg-cm/cm² or more in terms of Charpy impact strength at −20° C., and further has a transparency of 50% or less in terms of haze of a press sheet with a thickness of 1 mm. These products are useful in the manufacture of structures in which see-through of contents is required, such as blow bottles, tubes, hoses, etc.

(4) An olefinic copolymer, comprising 50 to 70 parts of one or more of block (A), which is selected from homopolymer blocks of propylene and binary random copolymer blocks of propylene and ethylene or a $C_{4-12}$ α-olefin and contains 100 to 60% of propylene, and 30 to 50 parts of one or more block (B), which is a binary random copolymer of ethylene and propylene and contains 30 to 85% of ethylene.

Crosslinked products comprising this polymer exhibit the physical properties of a flexibility of 6,000 Kg/cm² or less, more narrowly 5,000 Kg/cm² or less, in terms of Olsen flexural modulus (10° angle); a tensile strength of 60 Kg/cm² or more (measured by the method described hereinafter); a heat resistance in terms of deformation degree under heat and pressure of 15% or less (measured by the method described hereinafter); and a low temperature impact strength of 10 Kg-cm/cm² or more in terms of Charpy impact strength at −40° C. These products are useful for fabricating automobile parts such as bumpers, hoses, coating materials of cables, etc.

(5) An olefinic copolymer, comprising 50 to 70 parts of one or more of block (A), which is selected from homopolymer blocks of propylene and binary random copolymer blocks of propylene and ethylene or a $C_{4-12}$ α-olefin and contains 60 to 100% of propylene, and 30 to 50 parts of one or more of block (B), which is a binary or ternary copolymer of ethylene and a $C_{4-12}$ α-olefin optionally with propylene and contains 30 to 85% of ethylene.

Crosslinked products prepared with the use of this polymer exhibit the physical properties of a flexibility of 5,000 Kg/cm² or less, more narrowly 4,000 Kg/cm² or less, in terms of Olsen flexural modulus (10° angle); a tensile strength of 60 Kg/cm² or more (measured by the method described hereinafter); a heat resistance in terms of deformation degree under heat and pressure of 15% or less (measured by the method described hereinafter); and a low temperature impact strength of 10 Kg-cm/cm² or more in terms of Charpy impact strength at −40° C. These products are useful for fabricating automobile parts such as bumpers, hoses, calbe coating materials, etc.

(2) Molecular weight

The block copolymer is required to have a molecular weight, as represented by its measure of MFR (according to ASTM-D-1238 (L)), of 0.01 to 200 (g/10 min.). If the copolymer exceeds this range, the mechanical characteristics of the copolymer may fail to reach practical levels or forming or molding per se may be infeasible. With a MFR lower than this range, the rheological properties of the copolymer in molten state will be impaired, whereby forming or molding will also be rendered impossible.

(3) Fractionation of the copolymer

The copolymer of the present invention comprises the block (A) and the block (B), the former comprising a crystalline polymer and the latter of a rubbery polymer, and its real entity is a mixture manifesting multimolecular characteristics possessed essentially by a polymeric compound.

Accordingly, the block copolymer of the present invention may be defined as one having a specific solvent fractionation pattern.

(1) Solvent fractionation

Solvent fractionation is carried out with the use of cold xylene as follows. 300 ml of p-xylene and about 0.7 g of accurately weighed polymer (A gram) are heated (by using an oil bath) at 160° C. for 15 minutes to prepare a solution, which is left to cool while being immersed in the oil bath and thereafter left to stand at room temperature for 24 hours to precipitate the polymer. The precipitated polymer is filtered by aspiration through a filter cloth to obtain a solid polymer (B gram after drying) and a solution (C gram after concentration and drying).

When the cold xylene solubles (not corrected) and insolubles (not corrected) are respectively designated by CXS′ and CXIS′, they can be defined as follows.

$CXS' = C/A \times 100 \ (\%)$ $CXIS' = B/A \times 100 \ (\%)$

Ordinarily, some losses are incurred to give the result of $CXS' + CXIS' < 100$, and therefore the corrected cold xylene solubles CXS and CXIS may be defined, respectively, as follows:

$$CXS = \frac{CXS'}{CXS' + CXIS'} \times 100 \ (\%)$$

$$CXIS = \frac{CXIS'}{CXS' + CXIS'} \times 100 \ (\%)$$

(2) Analysis of fractionation results

The cold xylene solubles (CXS) correspond primarily to the rubbery polymer (Block (B)) formed in the polymerization at the second stage (as described in detail below). For CXS, no melting peak is generally observed according to a DSC (differential scanning calorimeter). The content of CXS is 15% or more, preferably 20% or more, more preferably 25% or more.

On the other hand, the cold xylene insolubles (CXIS) correspond primarily to the crystalline polymer (Block (A)) formed in the polymerization at the first stage (as described in detail below). For CXIS, one or more melting peaks are observed according to a DSC, and the temperature of the peaks exhibiting the maximum temperature is at least 120° C., preferably at least 130° C., more preferably at least 140° C. The content of the CXIS is 85% or less, preferably 80% or less, more preferably 75% or less.

2. Preparation of Block Copolymer

The block copolymer of the present invention can be prepared, in the presence of stereospecific polymerization catalysts, by the combination of a step (a) comprising forming 5 to 70 parts, preferably 10 to 65 parts, more preferably 15 to 60 parts of a random copolymer of propylene and ethylene and/or a $C_{4-12}$ α-olefin and a step (b) comprising forming 30 to 95 parts, preferably 35 to 90 parts, more preferably 40 to 85 parts, of a binary or ternary random copolymer of ethylene and $C_{3-12}$ α-olefins.

Either of the steps (a) and (b) may be conducted first, or other polymerization steps (e.g., the step of homopolymerization of polypropylene) may also be inserted before, between or after the steps (a) and (b). The proportions of the respective monomers to be polymerized in the steps (a) and (b) are the same as those described with respect to the composition of the block copolymer.

The stereospecific polymerization catalysts suitable for use in the present invention are, for example, those comprising titanium components and organoaluminum compounds. As the titanium components, α, β, γ, or δ type titanium trichloride or titanium compounds carried on a carrier such as magnesium chloride are employed. Particularly, among the titanium trichlorides, when use is made, as the titanium component of the catalyst, a titanium trichloride, which has been prepared by reducing titanium tetrachloride with an organoaluminum, extracting aluminum chloride with a complexing ageht from the resultant titanium trichloride (of which the principal component is considered to be an eutectic crystal complex of titanium trichloride and aluminum chloride), and further subjecting the titanium trichloride to activation treatment by an appropriate method, it is possible to make the block (B) more elastic than those in the cases where other titanium trichlorides are employed.

When it is desired to obtain a block copolymer at a high yield relative to the catalyst, the use of titanium trichloride or titanium tetrachloride carried on a carrier such as magnesium chloride is recommendable.

As organoaluminum compounds, compounds represented by the formula $AlR_aY_{3-a}$ are suitable. In the above formula, a is a number defined by $0 < a \leq 3$, Y is a halogen atom, and R is a hydrocarbon residue of ca. $C_{1-18}$, preferably an alkyl or an aryl. More specifically, triethylaluminum and diethylaluminum chloride are preferred.

A catalyst comprising the combination of the two essential components may also be combined with a small quantity of an electron donor. As this electron donor, organic acid esters, ethers, amines, alcohols, ketones, aldehydes and phenols may be used. Typical examples of electron donors usable in the present invention can be found in Japanese Patent Laid-open Publication No. 158489/79.

Polymerization can be carried out by either continuous or batch process. When using a continuous process, at least one polymerization tank is employed for each of the aforesaid steps (a) and (b), and the reaction is performed under steady state conditions in each tank. In the case of a batch process, each step is transferred to the successive step after completion of the reaction of the total amount or a predetermined amount of the monomers in each step, and the successive step is carried out after discharging a part or all of unreacted monomers out of the tank on completion of polymerization of the predetermined amount of monomers.

The process of the present invention is practiced generally at a polymerization temperature of 0 to 200° C., under a pressure of 0 to 100 $Kg/cm^2$ (gauge). A slight negative pressure (gauge) is also permissible. For controlling the molecular weight of a copolymer, hydrogen can be used. It is also possible to change the hydrogen concentration between respective steps, thereby creating a difference in the molecular weight of the copolymer blocks formed.

Ordinarily, polymerization is carried out by the suspension polymerization system or the solution polymerization system in an inert hydrocarbon solvent such as n-heptane, n-hexane, etc.

3. Crosslinked Product of Block Copolymer

The crosslinked product of the present invention is derived from an olefinic block copolymer, which has been described in detail hereinbefore. In the present crosslinked product, it appears that the portion corresponding primarily to the block (B) participates in crosslinking, while the portion corresponding to the block (A) remains substantially irrelevant to crosslinking, thus contributing to impart fluidity to the crosslinked product at the time of melting. Therefore, the present crosslinked product may be considered to have a partially crosslinked structure so to speak. Such a partially crosslinked structure is, of course, attributable to the specific chemical structure of the block copolymer which is the precursor thereof. Such a partially crosslinked structure is also the basis for the excellent balance between heat resistance and formability or moldability of the present crosslinked product.

That the present crosslinked product is partially crosslinked (therefore having good heat resistance) and also the excellent formability or moldability can be seen from the gel content as measured as hot xylene insolubles and from the melt flow property under high shear stress as measured by a flow tester.

That is, the crosslinked product of the present invention contains 5 to 75%, preferably 10 to 65%, more preferably 15 to 60% of hot xylene insolubles (gels). When the gel content is lower than this range, the heat resistance is insufficient. On the other hand, when it is in excess of this range, the formability or moldability is impaired. Measurement of hot xylene gel content can be conducted by the use of a Soxhlet extractor, by setting about 1 g of a sample minced as small as possible and enclosed within a 80-mesh metal gauze and carrying out extraction for 10 hours under the condition of about one reflux of p-xylene occurring per 30 minutes.

The melt flow property of the crosslinked product of the present invention is required to be such that the fluidity (resin quantity flowing out through orifice per second ($cc/sec. \times 10^{-3}$)) as measured by Koka flow tester under the conditions shown below will be 3 to 500, preferably 4 to 350, more preferably 5 to 200. With a fluidity lower than this range, difficulty is encountered in forming or molding. A fluidity exceeding this range itself entails no problem but is not desirable because it will generally be accompanied by a lowered gel content impairing the heat resistance.

Cylinder diameter: 10 mmφ
Orifice diameter: 1 mmφ

Orifice height: 2 mmφ
Load: 30 Kg
Resin temperature: 200° C.

4. Process for Preparation of Crosslinked Product

Any known technique can be applied for the preparation of the crosslinked product.

A typical example is the mechanical fusion kneading process, in which use is made of a generally used kneader such as a monoaxial extruder, biaxial extruder, Banbury mixer, and any of various kneaders, whereby partial crosslinking can be effected by a known method during the stage of kneading.

As crosslinking agents, aromatic or aliphatic peroxides or azo compounds are employed. These may be employed either singly or in mixtures. In order to obtain a high gel content, it is preferable to employ a crosslinking aid such as sulfur or a bifunctional compound exemplified by a divinyl compound (e.g., divinylbenzene) and a diallyl compound (e.g., diallyl phthalate).

Typical examples of crosslinking agents are 2,5-dimethyl-2,5 (benzoylperoxy)hexane, t-butylperoxyperbenzoate, dicumyl peroxide, 2,5-dimethyl-2,5-di(t-butylperoxy)hexane, t-butylcumyl peroxide, diisopropylbenzene hydroperoxide, and 1,3-bis-t-butylperoxyisopropylbenzene.

For the purpose of obtaining uniform crosslinking and controlling of crosslinking reactions in crosslinking at the time of mechanical fusion kneading, it is also possible to use a crosslinking retarder, depending on the necessity. Examples of such retarders are scorch retarders against organic peroxide crosslinking such as hydroquinone, 2,6-di-t-butyl-p-cresol, t-butylcatechol, 4,4'-butylidenebis(3-methyl-6-t-butylphenol), 2,2'-methylenebis(4-methyl-6-t-butylphenol), 4,4'-thiobis(6-t-butyl-3-methylphenol), mercaptobenzothizaole, dibenzothiazole disulfide, 2,2,4-trimethyl-1,2-dihydroquinone polymer, phenyl-$\beta$-naphthylamine, N,N'-di-$\beta$-naphthyl-p-phenylenediamine, and N-nitrosodiphenylamine.

The crosslinked product of the present invention may also incorporate various modifiers and various auxiliary materials which can be used in polymers. For example, the crosslinked product of the present invention may be blended before use with fillers such as carbon and white pigments, process oils such as paraffinic and naphthenic oils, plasticizers such as dioctyl phthalate, and pigments which are conventionally used. Depending on the necessity, it is also possible to add additives such as thermal stabilizers, antioxidants, and UV-ray absorbers.

6. Experimental Examples

In the following Examples and Comparative Examples, unless otherwise stated, the test methods used for evaluation of the resulting products are as follows.

(1) Melt flow rate (MRF) (230° C., 2.16 Kg):
ASTM-D-1238 (L) (g/10 min.)

(2) Olsen flexural modulus (10° angle):
ASTM-D-747 (Kg/cm$^2$)
(Sample=2 mm thick press sheet)

(3) Tensile strength: Japanese Industrial Standards JIS-K-6301 Test strip: No. 3 form (Kg/cm$^2$) (Sample=2 mm thick injection molded sheet)

(4) Tensile elongation: JIS-K-6301
Test strip: No. 3 form (%)

(5) Fluidity (measure of moldability):
In Koka flow tester, each sample is charged into a cylinder of 10-mm diameter, heated to 200° C., and then, with application of a load of 30 Kg, the quantity of the resin flowing out through an orifice of 1 mm diameter$\times$2 mm height is metered. ($\times 10^{-3}$ cc/sec.). The Koka flow tester comprises a cylinder equipped with a heating means and having an orifice at the bottom and with a plunger capable of putting a constant load to the molten resin in the resin to extrude it through the orifice at a constant volumetric flow rate. See T. Arai: A Guide to the Testing of Rheological Properties with Koka Flow Tester, Maruzen, Tokyo, Japan (1958).

(6) Deformation under heat and pressure:
Each sample (1 cm$\times$1 cm$\times$2 mm thick pressed sheet) is mounted on a device capable of applying a load on the sample in a heated silicone oil and measuring deformation of the sample, and left to stand at 10° C. under a load of 3 Kg/cm$^2$ for one hour, and 10 minutes after removal of the load, the percentage of the deformation in thickness is meausred. (%)

(7) Permanent elongation (measure of permanent set): JIS-K-6301

Test strip: No. 1 form The test strip is held under 100% elongated state for 10 minutes, and then abruptly permitted to shrink and the residual elongation after 10 minutes of standing is determined. (%)

(8) Gel content (content of hot xylene insolubles/-measure of crosslinking degree):
About one gram of a sample is enclosed within a 80-mesh stainless-steel gauze, placed in a Soxhlet extractor, and extracted under reflux of hot xylene for 10 hours. The ratio of the residual portion to the charged sample is determined. (%)

(9) Transparency (haze): JIS-K-6714
Integrating sphere type light transmittance measuring device is employed (Sample: 1 mm thick pressed sheet). (%)

(10) Charpy impact strength: JIS-K-7111
(Sample: 2 mm thick pressed sheets, 3-ply, notched).

Example A1

After a stainless-steel reactor of 10-liter inner volume, equipped with a stirring blade, had been internally replaced thoroughly with propylene gas, 4.0 liter of n-heptane was charged as a polymerization solvent into the reactor. The temperature in the reactor was set at 60° C., and 2.00 g of diethylaluminum chloride (DEAC) and 0.40 g of titanium trichloride (THL-1, produced by Marubeni Solvay Kagaku Co., Japan) were added to make up a catalyst. Subsequently, propylene and hydrogen were fed at rates of 360 g/hour and 4.5 liters (calculated at STP)/hour, respectively, and feeding of both materials was stopped when the total quantity of propylene fed reached 290 g. While the temperature in the reactor was maintained at 60° C., the propylene remaining in the reactor was allowed to react until the inner pressure was lowered to 2.0 Kg/cm$^2$ (gauge). Then, the unreacted gas in the reactor was discharged until the inner pressure became 0,4 Kg/cm$^2$ (gauge). (Preparation of Block A; homopolymerization of propylene.).

As the next step, ethylene and butene-1 were fed at rates of 75 g/hour and 380 g/hour, respectively, over 3 hours and 30 minutes. During this period, the inner temperature was maintained at 55° C. and no hydrogen was fed. (Preparation of Block B; ethylene/butene-1 copolymerization).

The resultant block copolymer was purified with alcohol and dried.

The resultant block copolymer was found to have proportions and compositions of respective blocks and physical properties as shown in Table 1. It is difficult, however, to calculate the proportions and compositions of respective blocks from only this experiment. Therefore, the same experiment as above was repeated separately under the same conditions up to intermediate stages of polymerization, whereupon the catalyst was decomposed, and the weight and the composition of the resultant polymer were measured. With the postulation that these values are applicable in the corresponding stage in the polymerization in this Example A1, the final proportions and compositions were calculated indirectly therefrom. Measurement of composition was conducted according to carbon 13 NMR.

Example A2

Block copolymerization was carried out under the conditions in Example A1 except that the quantity of the polymerization solvent n-heptane fed was changed to 2.6 liter, the temperature in the reactor during preparation of Block B to 65° C., ethylene and hexene-1 were employed as monomers in place of ethylene and butene-1, at feeding rates of 70 g/hour and 900 g/hour, respectively, and ethylene was fed over 3 hours and hexene-1 over one hour. The results are shown in Table 1.

Comparative Example a1

A block copolymer was prepared under the conditions in Example A2 except that the quantity of the polymerization solvent n-heptane fed was changed to 3.0 liter, the total quantity of propylene fed and the feeding rate of hydrogen were changed to 200 g and 5.0 liter (calculated at STP)/hour, respectively, during preparation of Block A; and feeding rates of ethylene and hexene-1 were changed to 75 g/hour and 300 g/hour, respectively during preparation of Block B. The results are shown in Table 1.

Example A3

A block copolymer was prepared under the conditions in Example A1 except that ethylene, butene-1 and propylene were fed as monomers during preparation of Block B at the rates of 40 g/hour, 80 g/hour and 80 g/hour, respectively. The results are shown in Table 1.

Comparative Example a2

A block copolymer was prepared under the conditions in Example A3 except that the feeding rates of propylene and hydrogen during preparation of Block A were changed to 90 g/hour and 0.4 liter (calculated at STP)/hour, the total amount of propylene fed was changed to 15 g, purging was immediately effected to a pressure of 0.4 Kg/cm$^2$ (gauge); and during the preparation of Block B, hydrogen was fed at a rate of 2 liter (calculated at STP)/hour and ethylene, butene-1, propylene and hydrogen were fed for 2 hours. The results are shown in Table 1.

Comparative Example a3

A block copolymer was prepared under the conditions in Comparative Example a2 except that during preparation of Block A, the feeding rates of propylene and hydrogen were changed to 360 g/hour and 2.0 liter (calculated at STP)/hour, respectively, the total quantity of propylene fed changed to 485 g, continuous polymerization being subsequently conducted to a pressure of 2.0 Kg/cm$^2$ (gauge), followed by purging to a pressure of 0.4 Kg/cm$^2$ (gauge); and during preparation of Block B, no hydrogen was fed. The results are shown in Table 1.

Example A4

A block copolymer was prepared under the conditions in Example A2 except that preparation of Block B was carried out by the use of ethylene, hexene-1 and propylene as monomers in place of ethylene and hexene-1, the feeding rates thereof being 50 g/hour, 450 g/hour and 100 g/hour, respectively, and the feeding time being 3.5 hours for ethylene and propylene, and one hour for hexene-1.

Example A5

After the same reactor as that used in Example A1 had been internally replaced thoroughly with propylene gas, 4.0 liter of n-heptane was charged as a polymerization solvent into the reactor. The temperature in the reactor was set at 55° C., and 2.0 g of DEAC and 0.40 g of titanium trichloride (THL-1, produced by Marubeni Solvay Kagaku Co., Japan) were added to make up a catalyst. Subsequently, propylene, ethylene and hydrogen were fed at the rates of 360 g/hour, 21.6 g/hour and 5.5 liter (calculated at STP)/hour, respectively, over 50 minutes. After the feeding was discontinued, the gas in the reactor was purged to an inner pressure of 0.4 Kg/cm$^2$ (gauge). (Preparation of Block A; copolymerization of propylene/ethylene.)

As the next step, while the temperature in the reactor was maintained at 55° C., ethylene and butene-1 were fed thereinto at rates of 60 g/hour and 480 g/hour, respectively, over 3 hours and 20 minutes. During this period, no hydrogen was fed. (preparation of Block B; ethylene/butene-1 copolymerization.)

The resultant block copolymer was purified with alcohol and dried. The results are shown in Table 1.

Example A6

A block copolymer was prepared under the conditions in Example A5 except that the quantity of the polymerization solvent n-heptane fed was changed to 2.6 liter, the temperature in the reactor during the preparation of Block B to 65° C., ethylene and hexene-1 were employed as monomers in place of ethylene and butene-1 at feeding rates of 70 g/hour and 900 g/hour, respectively, and ethylene was fed over 3 hours and hexene-1 over one hour. The results are shown in Table 1.

Example A7

A block copolymer was prepared under the conditions in Example A5 except that preparation of Block A was performed in two steps by first feeding propylene and further feeding ethylene at a rate of 23.4 g/hour after an elapse of 15 minutes, and during preparation of Block B, not only ethylene and butene-1, but also propylene was fed, at rates of 40 g/hour, 80 g/hour and 80 g/hour, respectively. The results are shown in Table 1.

Example A8

A block copolymer was prepared under the conditions in Example A7 except that Block A was prepared by the use of propylene and butene-1 as monomers in place of propylene and ethylene, the feeding rates of the monomers and hydrogen being 360 g/hour, 150 g/hour and 4.5 liter (calculated at STP)/hour, respectively. The results are shown in Table 1.

Comparative Example a4

A block copolymer was prepared under the conditions in Example A8 except that the feeding rates of propylene, butene-1 and hydrogen during the preparation of Block A were changed to 120 g/hour, 360 g/hour and 3.5 liter (calculated at STP)/hour, and feeding of each material was continued for 50 minutes. The results are shown in Table 1.

Example A9

A block copolymer was prepared under the conditions in Example A7 except that during the preparation of Block B, hexene-1 was employed in place of butene-1, the feeding rates of ethylene, propylene and hexene-1 being set at 50 g/hour, 100 g/hour and 450 g/hour, and ethylene and propylene were fed over 3.5 hours, while hexene-1 was fed over 10 hours. The results are shown in Table 1.

Examples B1 through B9

The internal temperature of a pressure kneader for rubber of one-liter capacity was set at 170° C., and 100 parts each of the copolymers of Examples A1 through A9 were charged thereinto respectively in nine separate experiments. In each experiment, after fusion kneading for 3 minutes, 0.5 part of a peroxide ("Percadox", produced by Kayaku Nuily Co., Japan) as a crosslinking agent, and 0.05 part of dibenzothiazole disulfide as a crosslinking retarder were added to the mixture, after which fusion kneading was resumed for 7 minutes to carry out crosslinking treatment of each copolymer. The results of evaluation of the physical properties of the products thus obtained are shown in Table 2.

Comparative Examples b1 through b4

Crosslinking treatment was carried out in four separate experiments under the conditions in Examples B1 through B9 except that the copolymers of Comparative Examples a1–a4 were employed respectively as starting materials. The results of evaluation of physical properties of the products thus obtained are shown in Table 2.

Examples B10 through B13

A pressure kneader for rubber of one-liter capacity was set at a temperature of 170° C., and 90 parts each of the copolymers of Examples A1, A3, A4, and A5 were charged thereinto respectively in four separate experiments. In each experiment, after fusion kneading for 3 minutes, 0.5 part of a peroxide ("Percadox", produced by Kayaku Nuily Co.) as crosslinking agent, 10 parts of a liquid polybutadiene ("NISSO PB B-3000", produced by Nippon Soda Co., Japan) as crosslinking aid, and 0.05 part of dibenzothiazole disulfide as crosslinking retarder were added to the mixture, after which fusion kneading was resumed for 7 minutes to carry out crosslinking treatment of each copolymer. The results of evaluation of the physical properties of the products thus obtained are shown in Table 2.

Examples B14 through B17

Crosslinking treatment was carried out in four separate experiments under the conditions in Examples B10 through B13 except that the amount of each of the starting copolymers (of Examples A1, A3, A4 and A5) charged was changed to 95 parts, and 5 parts of p,p'-dibenzoylquinonedioxime ("Acter DQ", produced by Kawaguchi Kagaku Kogyo Co., Japan) was employed as a crosslinking aid in place of the liquid 1,2-polybutadiene. The results are shown in Table 2.

TABLE 1

| | | Examples | | | | | | |
|---|---|---|---|---|---|---|---|---|
| | | Ex. A1 | Ex. A2 | Com. Ex. a1 | Ex. A3 | Com. Ex. a2 | Com. Ex. a3 | Ex. A4 |
| Block A | Content (%) | 43.1 | 35.2 | 40.0 | 43.3 | 4.1 | 73.0 | 37.8 |
| | MFR (g/10 min.) | 81.3 | 81.3 | 81.3 | 81.3 | 1.1 | 7.0 | 81.3 |
| | Propylene content (%) | 100 | 100 | 100 | 100 | 100 | 100 | 100 |
| | α-olefin content (%) | 0 | 0 | 0 | 0 | 0 | 0 | 0 |
| Block B | Content (%) | 56.9 | 64.8 | 60.0 | 56.7 | 59.9* | 27.0* | 62.2 |
| | Ethylene content (%) | 61.3 | 39.2 | 86.2* | 52.9 | 53.2 | 53.7 | 50.3 |
| | α-olefin content (%) | butene-1 36.6 | hexene-1 58.9 | hexene-1 11.9 | butene-1 16.9 | butene-1 17.0 | butene-1 17.4 | hexene-1 20.1 |
| | Propylene content (%) | 2.1 | 1.9 | 1.9 | 30.2 | 29.8 | 28.9 | 29.6 |
| Final Block Copolymer | MFR (g/10 min.) | 0.8 | 1.2 | 1.2 | 0.9 | 1.2 | 0.9 | 1.2 |
| | Ethylene content (%) | 34.9 | 25.4 | 51.7 | 30.0 | 51.0 | 14.5 | 31.3 |
| | Propylene content (%) | 44.2 | 36.6 | 41.2 | 60.4 | 32.7 | 80.8 | 56.2 |
| | α-olefin content (%) | butene-1 20.9 | hexene-1 38.0 | hexene-1 7.1 | butene-1 9.6 | butene-1 16.3 | butene-1 4.7 | hexene-1 12.5 |
| | Olsen flexural modulus (Kg/cm$^2$) | 980 | 650 | 6150 | 850 | 100 | 4530 | 750 |
| | Tensile strength at rupture (Kg/cm$^2$) | 95 | 108 | 160 | 85 | 10 | 170 | 110 |
| | Elongation at rupture (%) | 850 | 880 | 780 | 780 | 200 | 800 | 820 |
| | −40° C. Charpy impact strength (Kg-cm/cm$^2$) | NB* | NB | NB | NB | NB | 7.4 | NB |

| | | Examples | | | | | |
|---|---|---|---|---|---|---|---|
| | | Ex. A5 | Ex. A6 | Ex. A7 | Ex. A8 | Com. Ex. a4 | Ex. A9 |
| Block A | Content (%) | 43.0 | 35.2 | 42.3 | 43.6 | 43.4 | 35.3 |
| | MFR (g/10 min.) | 82.5 | 82.5 | 82.5 | 82.0 | 81.5 | 82.5 |
| | Propylene content (%) | 94.2 | 94.2 | 94.8 | 80.2 | 34.8* | 94.8 |
| | α-olefin content (%) | ethylene 5.8 | ethylene 5.8 | ethylene 5.2 | butene-1 19.8 | butene-1 65.2 | ethylene 5.2 |
| Block B | Content (%) | 57.0 | 64.8 | 57.7 | 56.4 | 56.6 | 64.7 |
| | Ethylene content (%) | 47.9 | 35.7 | 53.9 | 53.0 | 53.5 | 49.1 |
| | α-olefin content (%) | butene-1 | hexene-1 | butene-1 | butene-1 | butene-1 | hexene-1 |

TABLE 1-continued

|  |  |  |  |  |  |  |  |
|---|---|---|---|---|---|---|---|
| | | 48.2 | 63.4 | 16.8 | 16.6 | 16.3 | 19.6 |
| | Propylene content (%) | 3.9 | 2.1 | 29.3 | 30.4 | 30.2 | 31.3 |
| Final | MFR (g/10 min.) | 0.8 | 1.3 | 1.2 | 1.0 | 1.1 | 1.2 |
| Block | Ethylene content (%) | 29.8 | 25.2 | 33.3 | 29.9 | 30.3 | 33.6 |
| Copoly- | Propylene content (%) | 42.8 | 33.8 | 57.0 | 51.8 | 32.2 | 53.7 |
| mer | α-olefin content (%) | butene-1 | hexene-1 | butene-1 | butene-1 | butene-1 | hexene-1 |
| | | 27.4 | 41.0 | 9.7 | 18.3 | 37.5 | 12.7 |
| | Olsen flexural modulus (Kg/cm$^2$) | 500 | 350 | 530 | 720 | 100 | 450 |
| | Tensile strength at rupture (Kg/cm$^2$) | 73 | 75 | 75 | 80 | 20 | 95 |
| | Elongation at rupture (%) | 800 | 750 | 780 | 800 | 700 | 800 |
| | −40° C. Charpy impact strength (Kg-cm/cm$^2$) | NB | NB | NB | NB | NB | NB |

*NB indicates that sample was not broken.

TABLE 2

| | | Examples | | | | | | | |
|---|---|---|---|---|---|---|---|---|---|
| | | Ex. B1 | Ex. B2 | Ex. B3 | Ex. B4 | Ex. B5 | Ex. B6 | Ex. B7 | Ex. B8 |
| Recipe | Starting copolymer (wt. parts) | Ex. A1 100 | Ex. A2 100 | Ex. A3 100 | Ex. A4 100 | Ex. A5 100 | Ex. A6 100 | Ex. A7 100 | Ex. A8 100 |
| | Peroxide*[1] (wt. parts) | 0.5 | 0.5 | 0.5 | 0.5 | 0.5 | 0.5 | 0.5 | 0.5 |
| | Crosslinking aid*[2] (wt. parts) | — | — | — | — | — | — | — | — |
| | Crosslinking retarder*[3] (wt. Parts) | 0.05 | 0.05 | 0.05 | 0.05 | 0.05 | 0.05 | 0.05 | 0.05 |
| Physical Properties of Crosslinked Product | Gel content (wt. %) | 43.2 | 40.0 | 29.1 | 37.5 | 34.5 | 39.7 | 30.3 | 31.8 |
| | Fluidity (× 10$^{-3}$ cc/sec.) | 61 | 55 | 67 | 60 | 73 | 57 | 71 | 72 |
| | Deformation under heat pressure (%) | 7.5 | 9.1 | 9.8 | 10.2 | 10.1 | 14.0 | 11.2 | 9.0 |
| | Olsen flexural modulus (Kg/cm$^2$) | 1220 | 750 | 1050 | 800 | 510 | 400 | 620 | 800 |
| | Permanent elongation (%) | 29 | 28 | 34 | 29 | 30 | 28 | 31 | 30 |
| | Tensile strength at rupture (Kg/cm$^2$) | 125 | 115 | 104 | 120 | 90 | 85 | 92 | 110 |
| | −40° C. Charpy impact strength (Kg-cm/cm$^2$) | NB*[4] | NB | NB | NB | NB | NB | NB | NB |

| | | Experimental Example | | | | | |
|---|---|---|---|---|---|---|---|
| | | Ex. B9 | Com. Ex. b1 | Com. Ex. b2 | Com. Ex. b3 | Com. Ex. b4 | Ex. B10 |
| Recipe | Starting copolymer (wt. parts) | Ex. A9 100 | Com. Ex. a1 100 | Com. Ex. a2 100 | Com. Ex. a3 100 | Com. Ex. a4 100 | Ex. A1 100 |
| | Peroxide*[1] (wt. parts) | 0.5 | 0.5 | 0.5 | 0.5 | 0.5 | 0.5 |
| | Crosslinking aid*[2] (wt. parts) | — | — | — | — | — | a 10 |
| | Crosslinking retarder*[3] (wt. parts) | 0.05 | 0.05 | 0.05 | 0.05 | 0.05 | 0.05 |
| Physical Properties of Crosslinked Product | Gel content (wt. %) | 37.0 | 49.4 | 51.2 | 8.2 | 32.2 | 49.0 |
| | Fluidity (× 10$^{-3}$ cc/sec.) | 56 | 53 | 2 | 105 | 85 | 51 |
| | Deformation under heating pressurization (%) | 13.1 | 3.5 | 14.8 | 2.0 | 15.2 | 6.5 |
| | Olsen flexural modulus (Kg/cm$^2$) | 510 | 7060 | <100 | 5500 | 120 | 1270 |
| | Permanent elongation (%) | 29 | 25 | 14 | 62 | 36 | 27 |
| | Tensile strength at rupture (Kg/cm$^2$) | 110 | 200 | 20 | 180 | 25 | 138 |
| | −40° C. Charpy impact strength (Kg-cm/cm$^2$) | NB | NB | NB | 6.2 | NB | NB |

| | | Experimental Example | | | | | | |
|---|---|---|---|---|---|---|---|---|
| | | Ex. B11 | Ex. B12 | Ex. B13 | Ex. B14 | Ex. B15 | Ex. B16 | Ex. B17 |
| Recipe | Starting copolymer (wt. parts) | Ex. A3 90 | Ex. A4 90 | Ex. A5 90 | Ex. A1 90 | Ex. A3 95 | Ex. A4 95 | Ex. A5 95 |
| | Peroxide*[1] (wt. parts) | 0.5 | 0.5 | 0.5 | 0.5 | 0.5 | 0.5 | 0.5 |
| | Crosslinking aid*[2] (wt. parts) | a 10 | a 10 | a 10 | b 5 | b 5 | b 5 | b 5 |
| | Crosslinking retarder*[3] (wt. parts) | 0.05 | 0.05 | 0.05 | 0.05 | 0.05 | 0.05 | 0.05 |
| Physical Properties of Crosslinked Product | Gel content (wt. %) | 43.2 | 42.6 | 42.8 | 48.2 | 40.4 | 44.0 | 43.8 |
| | Fluidity (× 10$^{-3}$ cc/sec.) | 55 | 51 | 57 | 49 | 56 | 50 | 59 |
| | Deformation under heating pressurization (%) | 7.5 | 8.5 | 8.6 | 6.0 | 7.5 | 8.7 | 9.0 |
| | Olsen flexural modulus | 1100 | 870 | 650 | 1250 | 1100 | 870 | 670 |

TABLE 2-continued

| (Kg/cm²) | | | | | | | |
|---|---|---|---|---|---|---|---|
| Permanent elongation (%) | 29 | 27 | 27 | 27 | 31 | 27 | 26 |
| Tensile strength at rupture (Kg/cm²) | 115 | 140 | 100 | 135 | 110 | 140 | 105 |
| −40° C. Charpy impact strength (Kg-cm/cm²) | NB | NB | NB | NB | NB | NB | NB |

*[1] "Percadox 14" produced by Kayaku Nuily Co., Japan.
*[2] a: 1,2-polybutadiene "NISSO PB B-3000" produced by Nippon Soda Co., Japan.
 b: p,p'-dibenzoylquinonedioxime "Acter DQ" produced by Kawaguchi Kagaku Kogyo Co.
*[3] dibenzothiazole disulfide
*[4] NB indicates that sample was not broken.

Example A21

After a stainless-steel reactor of 10 liter inner volume, equipped with a stirring blade, had been internally replaced thoroughly with propylene gas, 4.0 liter of n-heptane was charged as a polymerization solvent into the reactor. The temperature in the reactor was set at 20° C., and 2.0 g of diethylaluminum chloride (DEAC) and 0.40 g of titanium trichloride (THL-1, produced by Marubeni Solvay Kagaku Co.) were added to make up a catalyst. Subsequently, propylene and hydrogen were fed at rates of 360 g/hour and 4.5 liters (calculated at STP)/hour, respectively, and the temperature was rapidly elevated to 55° C. simultaneously with commencement of feeding. Ten minutes after commencement of feeding of propylene and hydrogen, feeding of ethylene was further begun at a rate of 21 g/hour. 50 minutes after commencement of the feeding of propylene, the feeding of propylene, ethylene and hydrogen was stopped, and unreacted monomers remaining in the reactor were allowed to react until the inner pressure was lowered to 2.0 Kg/cm² (gauge). Then, the gases remaining in the reactor were purged until the inner pressure became 0.4 Kg/cm² (gauge). (Preparation of Block A; homopolymerization of propylene and binary random copolymerization of propylene/ethylene.) (Note: in the experimental examples set forth below, when the inner pressure did not reach 2 Kg/cm² (gauge) on completion of monomer feeding, gases remaining in the reactor were immediately purged until the inner pressure became 0.4 Kg/cm² (gauge))

As the next step, while the inner temperature was set at 60° C., ethylene and propylene were fed both at a rate of 50 g/hour, and hydrogen was added in a quantity of 0.7 liter (calculated at STP) all at once first and was thereafter fed at a rate of 0.7 liter (calculated at STP)/hour over 4 hours and 15 minutes. (Preparation of Block B; ethylene/propylene binary random copolymerization.)

The resultant block copolymer was purified with alcohol and dried.

The resultant block copolymer was found to have proportions and compositions of respective blocks and physical properties as shown in Table 3. It is difficult, however, to calculate the proportions and compositions of respective blocks from only this experiment. Therefore, the same experiment as above was repeated separately under the same conditions up to intermediate stages of polymerization, whereupon the catalyst was decomposed, and the weight and the composition of the resultant polymer were measured. With the postulation that these values are applicable in the corresponding stages in the polymerization in this Example A21, the final proportions and compositions were calculated indirectly therefrom. Measurement of composition was conducted according to carbon 13 NMR.

Example A22

Block copolymerization was carried out under the conditions in Example A21, except that no ethylene was fed and the polymerization temperature was changed to 60° C. during the preparation of Block A, and propylene was fed at a rate of 75 g/hour during preparation of Block B. The results are shown in Table 3.

Example A23

After a stainless steel reactor of 10-liter inner volume, equipped with a stirring blade, had been internally replaced thoroughly with propylene gas, 4.5 liter of n-heptane was charged as a polymerization solvent into the reactor. While the temperature in the reactor was kept at 20° C., 2.0 g of diethylaluminum chloride (DEAC) and 0.40 g of titanium trichloride (THL-1, produced by Marubeni Solvay Kagaku Co.) were added to make up a catalyst. Subsequently, at an inner temperature set at 60° C., ethylene and propylene were fed at rates of 40 g/hour and 80 g/hour, and hydrogen was added in an amount of 0.7 liter (calculated at STP)/hour all at once first and was then fed at a rate of 0.7 liter/hour (calculated at STP) over 3.5 hours. Then, the gases remaining in the reactor were purged until the inner pressure became 0.4 Kg/cm² (gauge). (Preparation of Block B; ethylene/ propylene binary random copolymerization.)

As the next step, while the inner temperature was set at 60° C., feeding of propylene was commenced at a rate of 360 g/hour, and feeding of hydrogen at a rate of 4.5 liter (calculated at STP)/hour. Ten minutes after commencement of feeding of propylene and hydrogen, feeding of butene-1 was begun at a rate of 200 g/hour. The feeding of propylene, butene-1 and hydrogen was discontinued 50 minutes after commencement of the propylene feeding. (Preparation of Block A; propylene homopolymerization and propylene/butene-1 binary random copolymerization.)

The results are shown in Table 3.

Comparative Example a21

A block copolymer was prepared under the conditions in Example A21 except that during the preparation of Block A, the polymerization temperature was changed to 60° C., no ethylene was fed, and the inner pressure in the reactor was immediately lowered to 0.4 Kg/cm² (gauge) after propylene had been fed for 10 minutes, and that during the preparation of Block B, ethylene and propylene were fed at rates of 60 g/hour and 36 g/hour, respectively, and the amount of hydrogen added at once and the feeding rate thereafter were changed to 2.0 liter (calculated at STP) and 2.0 liter (calculated at STP)/hour, respectively. The results are shown in Table 3.

Comparative Example a22

A block copolymer was prepared under the conditions in Example A21 except that during the preparation of Block A, the feeding of ethylene was commenced simultaneously with the feeding of propylene, and its rate was changed to 16 g/hour, and that during the preparation of Block B, ethylene and propylene were fed at 75 g/hour and 10 g/hour, respectively, and the amount of hydrogen added and the feeding rate thereafter were changed to 2.0 liter (calculated at STP) and 2.0 liter (calculated at STP)/hour, respectively. The results are shown in Table 3.

Comparative Example a23

A block copolymer was prepared under the conditions in Example A21 except that during the preparation of Block A, the polymerization temperature was changed to 60° C., and no ethylene was fed, and that during the preparation of Block B, ethylene and propylene were fed at rates of 18 g/hour and 220 g/hour, respectively, and the amount of hydrogen added at once and the feeding rate thereafter were changed to 0.3 liter (calculated at STP) and 0.3 liter (calculated at STP)/hour, respectively. The results are shown in Table 3.

Example B21

A pressure kneader for rubber of one-liter capacity was set at a temperature of 170° C., and 90 parts of the block copolymer of Example A21 and 10 parts of a syndiotactic 1,2-polybutadiene (JSR RB T810, produced by Nippon Synthetic Rubber Co., Japan) as a crosslinking aid were charged thereinto. After fusion kneading for 3 minutes, 0.5 part of a peroxide ("Percadox", produced by Kayaku Nuily Co., Japan) as a crosslinking agent and 0.05 part or dibenzothiazole disulfide as a crosslinking retarder were added to the mixture, after which fusion kneading was resumed for 10 minutes to carry out crosslinking treatment of the block copolymer.

The results of evaluation of physical properties of the product are shown in Table 4.

Examples B2 and B23

Crosslinking treatment was carried out in two separate experiments under the conditions in Examples B21 except that the 85 parts each of the block copolymers of Example A22 and A23 were respectively employed as starting marerials, and 15 parts of a liquid 1,2-polybutadiene (NISSO PB B-3000, produced by Nippon Soda Co., Japan) was used as a crosslinking aid in each experiment.

The results of evaluation of physical properties of the respective products thus produced are shown in Table 4.

Example B24

Crosslinking treatment was carried out under the conditions in Example B21 except that 90 parts of the block copolymer of Example A21 and 10 parts of p,p'-dibenzoylquinonedioxime (produced by Kawaguchi Kagaku Kogyo Co., Japan) as a crosslinking aid were employed.

The results are shown in Table 2.

Comparative Examples b21 and b22

Crosslinking treatment was conducted in two separate experiments under the conditions in Example B21 except that the block copolymers of Comparative Examples a21 and a22 were respectively used.

The results are shown in Table 4.

Comparative Examples b23 and b24

Crosslinking treatment was conducted in two separate experiments under the conditions in Example B22 except that the block copolymers of Comparative Examples a21 and a23 were respectively used.

The results are shown in Table 4.

TABLE 3

|  |  | Example | | | Com. | Com. | Com. |
|---|---|---|---|---|---|---|---|
|  |  | Ex. A21 | Ex. A22 | Ex. A23 | Ex. a21 | Ex. a22 | Ex. a23 |
| Block A | Content (%) | 40.6 | 38.7 | 30.2 | 4.2* | 38.4 | 36.1 |
|  | MFR (g/10 min.) | 67.2 | 80.2 | 74.5 | 1.2 | 70.7 | 79.2 |
|  | Propylene content (%) | 94.8 | 100 | 79.7 | 100 | 95.8 | 100 |
|  | Ethylene or butene-1 content (%) | ethylene 5.2 | — | butene-1 20.3 | — | ethylene 4.2 | — |
| Block B | Content (%) | 59.4 | 61.3 | 69.8 | 95.8 | 61.6 | 63.9 |
|  | Ethylene content (%) | 62.0 | 57.1 | 50.3 | 69.6 | 91.7 | 9.8 |
|  | Propylene content (%) | 38.0 | 42.9 | 49.7 | 30.4 | 8.3 | 90.2 |
| Final Block Copolymer | MFR (g/10 min.) | 0.62 | 0.81 | 0.56 | 0.17 | 0.14 | 2.30 |
|  | Propylene content (%) | 59.3 | 65.0 | 58.8 | 33.2 | 41.9 | 92.5 |
|  | Ethylene content (%) | 40.7 | 35.0 | 35.1 | 66.8 | 58.1 | 7.5 |
|  | Butene-1 content (%) | — | — | 6.1 | — | — | — |

TABLE 4

|  |  | Ex. B21 | Ex. B22 | Ex. B23 | Ex. B24 | Com. Ex. b21 | Com. Ex. b22 | Com. Ex. b23 | Com. Ex. b24 |
|---|---|---|---|---|---|---|---|---|---|
| Recipe | Starting copolymer (wt. parts) | Ex. A21 90 | Ex. A22 85 | Ex. A23 85 | Ex. A21 90 | Com. Ex. a21 90 | Com. Ex. a22 90 | Com. Ex. a21 85 | Com. Ex. a23 85 |
|  | Peroxide*1 (wt. part) | 0.5 | 0.5 | 0.5 | 0.5 | 0.5 | 0.5 | 0.5 | 0.5 |
|  | Crosslinking aid*2 | a | b | b | c | a | a | b | b |
|  | (wt. parts) | 10 | 15 | 15 | 10 | 10 | 10 | 15 | 15 |
|  | Crosslinking retarder*3 (wt. parts) | 0.05 | 0.05 | 0.05 | 0.05 | 0.05 | 0.05 | 0.05 | 0.05 |
| Physical | Gel content (%) | 37.2 | 46.2 | 45.8 | 45.2 | 65.3 | 49.2 | 79.2 | 1.2 |

TABLE 4-continued

|  |  | Ex. B21 | Ex. B22 | Ex. B23 | Ex. B24 | Com. Ex. b21 | Com. Ex. b22 | Com. Ex. b23 | Com. Ex. b24 |
|---|---|---|---|---|---|---|---|---|---|
| Proper- ties of Cross- linked Product | Fluidity ($\times 10^{-3}$ cc/sec.) | 63 | 51 | 48 | 52 | 2.4 | 2.9 | 1.2 | 103 |
|  | Deformation under heat pressure (%) | 10.7 | 6.8 | 7.6 | 9.6 | 10.3 | 3.8 | 4.2 | 34.2 |
|  | Olsen flexural modulus (Kg/cm$^2$) | 1700 | 2300 | 1760 | 1800 | 420 | 4800 | 450 | 3600 |
|  | Permanent elongation (%) | 30 | 27 | 26 | 27 | 15 | 27 | 12 | 61 |
|  | Tensile strength at rupture | 88 | 106 | 89 | 95 | 32 | 178 | 36 | 142 |
|  | −40° C. Charpy impact strength (Kg-cm/cm$^2$) | — | NB*4 | NB | NB | NB | NB | NB | 3.4 |

*1"Percadox 14", produced by Kayaku Nuily Co., Japan.
*2a: Syndiotactic 1,2-polybutadiene "JSR RB810", produced by Nippon Synthetic Resin Co., Japan.
  b: Liquid 1,2-polybutadiene "NISSO PB B-3000", produced by Nippon Soda Co., Japan.
  c: p,p'-dibenzoylquinonedioxime, produced by Kawaguchi Kagaku Kogyo Co., Japan.
*3Dibenzothiazole disulfide
*4NB indicates that sample was not broken.

Example A31

After a stainless steel reactor of 10-liter inner volume, equipped with a stirring blade, had been internally replaced thoroughly with propylene gas, 4.0 liter of n-heptane was charged as a polymerization solvent into the reactor. The temperature in the reactor was kept at 20° C., and 1.2 g of diethylaluminum chloride (DEAC) and 0.40 g of titanium trichloride (THR-30, produced by Marubeni Solvay Kagaku Co., Japan) were added to make up a catalyst. Subsequently, propylene and hydrogen were fed at rates of 240 g/hour and 2.6 liters (calculated at STP)/hour, respectively, and the inner temperature was rapidly elevated to 55° C. simultaneously with commencement of feeding. Fifteen minutes after commencement of feeding or propylene and hydrogen, feeding of ethylene was further begun at a rate of 12.7 g/hour. 2.0 hours after commencement of the feeding of propylene, the feeding of propylene, ethylene and hydrogen was stopped and unreacted gases remaining in the reactor were purged until the inner pressure was lowered to 0.4 Kg/cm$^2$ (gauge; all the pressures are by gauge hereinafter). (Preparation of Block A; binary random copolymerization of propylene/ethylene.)

As the next step, while the inner temperature was set at 60° C., ethylene, propylene and butene-1 were fed at rates of 40 g/hour, 80 g/hour and 96 g/hour, respectively, and hydrogen at a rate of 0.5 liter/hour over 3.0 hours. (Preparation of Block B; ethylene/propylene/butene-1 ternary block copolymer.)

The resultant block copolymer was purified with alcohol and dried.

The resultant block copolymer was found to have the proportions and compositions of respective blocks and physical properties as shown in Table 5. It is difficult, however, to calculate the proportions and compositions of respective blocks from only this experiment. Therefore, the same experiment as above was repeated separately under the same conditions up to intermediate stages of polymerization, whereupon the catalyst was decomposed, and the weight and the composition of the resultant polymer were measured. With the postulation that these values are applicable in the corresponding stages in polymerization in this Example A31, the final proportions and compositions were calculated indirectly therefrom. Measurement of composition was conducted according to carbon 13 NMR.

Example A32

A block copolymer was prepared under the conditions in Example A21 except that in the preparation of Block A, not only propylene and ethylene but also butene-1 were employed as comonomers; ethylene and butene-1 were fed 15 minutes after commencement of the feeding of propylene at rates of 3.6 g/hour and 75 g/hour, respectively, and hydrogen at a rate of 3.2 liter (STP)/hour; these monomers and hydrogen were fed until 1.5 hours had elapsed after commencement of the feeding of propylene; and in the preparation of Block B, ethylene, propylene and butene-1 were fed at rates of 35 g/hour, 70 g/hour, and 140 g/hour, respectively, for 3.25 hours.

The results are shown in Table 5.

Example A33

A block copolymer was prepared under the conditions in Example A31 except that during the preparation of Block A, butene-1 was fed at a rate of 80 g/hour in place of ethylene, and hydrogen was fed at a rate of 3.4 liter (STP)/hour simultaneously with commencement of the feeding of propylene, and that during the preparation of Block B, ethylene, propylene and butene-1 were fed at rates of 45 g/hour, 80 g/hour and 105 g/hour, respectively, for 3.5 hours.

The results are shown in Table 5.

Comparative Example a31

A block copolymer was prepared under the conditions in Example A31 except that during the preparation of Block A, hydrogen was fed at a rate of 2.8 liters (STP)/hour, and that during the preparation of Block B, ethylene, propylene, butene-1 and hydrogen were fed at 60 g/hour, 36 g/hour, 60 g/hour and 0.7 liter (STP)/hour, respectively.

The results are shown in Table 5.

Comparative Example a32

A block copolymer was prepared under the conditions in Example A33 except that during the preparation of Block A, no ethylene was fed, but feeding of butene-1 was commenced at a rate of 120 g/hour simultaneously with the feeding of propylene, and propylene, butene-1 and hydrogen were fed all for 25 minutes.

The results are shown in Table 5.

Example B31

A pressure kneader for rubber of one-liter capacity was set at a temperature of 190° C., and 90 parts of the block copolymer of Example A31 and 10 parts of a liquid polybutadiene ("NISSO PB B-3000", produced by Nippon Soda Co., Japan) as a crosslinking aid were charged thereinto. After fusion kneading for 3 minutes, 0.5 part of a peroxide ("Percadox", produced by Kayaku Nuily Co., Japan) as a crosslinking agent and 0.05 part of dibenzothiazole disulfide as a crosslinking retarder were added to the mixture, after which fusion kneading was resumed for 12 minutes to carry out crosslinking treatment of the block copolymer.

The results of evaluation of physical properties of the product are shown in Table 6.

Examples B32 and B33

Crosslinking treatments were carried out in two separate experiments under the conditions in Examples B31 except that 95 parts each of the block copolymers of Example A32 and A33 were respectively employed as starting materials, and 5 parts of p,p'-dibenzoyl-quinonedioxime ("Acter DQ", produced by Kawaguchi Kagaku Kogyo Co., Japan) was used as a crosslinking aid.

The results are shown in Table 6.

Comparative Example b31

Crosslinking treatment was conducted under the conditions in Example B31 except that the block copolymer of Comparative Example a31 was used.

The results are shown in Table 6.

Comparative Example b32

Crosslinking treatment was conducted under the conditions in Example B32 except that the block copolymer of Comparative Example a32 was used.

The results are shown in Table 6.

TABLE 5

|  |  | Ex. A31 | Ex. A32 | Ex. A33 | Com. Ex. a31 | Com. Ex. a32 |
|---|---|---|---|---|---|---|
| Block A | Content (%) | 38.9 | 33.6 | 29.4 | 39.6 | 4.7 |
|  | MFR (g/10 min.) | 21.2 | 30.6 | 34.7 | 25.4 | 35.7 |
|  | Propylene content (%) | 94.6 | 84.7 | 85.4 | 94.5 | 85.8 |
|  | Ethylene content (%) | 5.4 | 1.6 | — | 5.5 | — |
|  | Butene-1 content (%) | — | 13.7 | 14.6 | — | 14.2 |
| Block B | Content (%) | 61.1 | 66.4 | 70.6 | 60.4 | 95.3 |
|  | Propylene content (%) | 21.4 | 20.0 | 22.6 | 28.6 | 37.2 |
|  | Ethylene content (%) | 38.7 | 34.0 | 37.8 | 47.2 | 22.7 |
|  | Butene-1 content (%) | 39.9 | 46.0 | 39.6 | 24.2 | 40.1 |
| Final copolymer | MFR (g/10 min.) | 1.10 | 1.13 | 0.83 | 1.06 | 0.86 |
|  | Propylene content (%) | 60.4 | 51.5 | 51.7 | 54.7 | 39.5 |
|  | Ethylene content (%) | 15.2 | 13.8 | 16.0 | 30.7 | 21.6 |
|  | Butene-1 content (%) | 24.4 | 35.1 | 32.3 | 14.6 | 38.9 |
|  | Olsen flexural modulus (Kg/cm$^2$) | 470 | 340 | 320 | 560 | <200 |
|  | Haze (%) | 21 | 19 | 18 | 87 | 8 |
|  | −20° C. Charpy impact strength (Kg-cm/cm$^2$) | NB | NB | NB | NB | NB |
|  | Deformation under heat and pressure, 130° C. (%) | 36 | 40 | 44 | 34 | 77 |
|  | Tensile strength at rupture (Kg/cm$^2$) | 76 | 71 | 66 | 84 | 10 |
|  | Elongation at rupture (%) | 720 | 730 | 740 | 700 | 470 |

NB indicates that sample was not broken.

TABLE 6

|  |  | Ex. B31 | Ex. B32 | Ex. B33 | Com. Ex. b31 | Com. Ex. b32 |
|---|---|---|---|---|---|---|
| Composition | Starting copolymer (wt. parts) | Ex. A31 90 | Ex. A32 95 | Ex. A33 95 | Com. Ex. a31 90 | Com. Ex. a32 95 |
|  | Peroxide*$^1$ (wt. parts) | 0.5 | 0.5 | 0.5 | 0.5 | 0.5 |
|  | Crosslinking aid*$^2$ (wt. parts) | a 10 | b 5 | b 5 | a 10 | b 5 |
|  | Crosslinking retarder*$^3$ (wt. parts) | 0.05 | 0.05 | 0.05 | 0.05 | 0.05 |
| Physical Properties | Gel content (%) | 44.1 | 45.2 | 48.7 | 43.5 | 66.7 |
|  | Fluidity (× 10$^{-3}$ cc/sec.) | 50.6 | 49.8 | 45.6 | 51.3 | 4.6 |
|  | Deformation under heat pressure, 130° C. (%) | 8.7 | 8.5 | 7.4 | 8.7 | 4.9 |
|  | Olsen flexural modulus (Kg/cm$^2$) | 510 | 370 | 360 | 580 | <200 |
|  | Permanent elongation (%) | 26 | 25 | 25 | 27 | 15 |
|  | Tensile strength at rupture (Kg/cm$^2$) | 87 | 85 | 74 | 106 | 25 |
|  | Haze (%) | 26 | 24 | 21 | 89 | 11 |
|  | −20° C. Charpy impact strength | NB | NB | NB | NB | NB |

TABLE 6-continued

|  | Example | | | | |
|---|---|---|---|---|---|
|  | Ex. B31 | Ex. B32 | Ex. B33 | Com. Ex. b31 | Com. Ex. b32 |
| (Kg-cm/cm²) | | | | | |

*¹"Percadox 14" produced by Kayaku Nuily Co., Japan.
*²a: 1,2-polybutadiene "NISSO PB B-3000" produced by Nippon Soda Co., Japan.
  b: p,p'-dibenzoylquinonedioxime "Acter DQ" produced by Kawaguchi Kagaku Kogyo Co., Japan.
*³dibenzothiazole disulfide.
*⁴NB indicates that sample was not broken.

Example A41

After a stainless steel reactor of 10 liter inner volume, equipped with a stirring blade, had been internally replaced thoroughly with propylene gas, 3.5 liter of n-heptane was charged as a polymerization solvent into the reactor. The temperature in the reactor was kept at 20° C., and 1.2 g of diethylaluminum chloride (DEAC) and 0.4 g of titanium trichloride (THB-19, produced by Marubeni Solvay Kagaku Co., Japan) were added to make a catalyst. Subsequently, propylene and hydrogen were fed at rates of 360 g/hour and 4.5 liters (calculated at STP)/hour, respectively, and the inner temperature was rapidly elevated to 60° C. simultaneously with commencement of feeding. The feeding of both materials was discontinued when the total amount of propylene fed had reached 390 g, and unreacted propylene remaining in the reactor was allowed to react until the inner pressure was lowered to 2.0 Kg/cm² (gauge). Then, the gases remaining in the reactor were purged until the inner pressure became 0.4 Kg/cm² (Preparation of Block A; homopolymerization of propylene.)

As the next step, while the inner temperature was set at 65° C., ethylene and propylene were fed at rates of 60 g/hour and 60 g/hour, respectively, over 3 hours and 30 minutes. During this reaction, the temperature in the reactor was kept at 65° C., and no hydrogen was fed. (Preparation of Block B; ethylene/propylene block copolymer.)

The resultant block copolymer was purified with alcohol and dried.

The resultant block copolymer was found to have the proportions and compositions of respective blocks and physical properties as shown in Table 7. It is difficult, however, to calculate the proportions and compositions of respective blocks from only this experiment. Therefore, the same experiment as above was repeated separately under the same conditions up to the intermediate stages of polymerization, whereupon the catalyst was decomposed and the weight and the composition of the resultant polymer were measured. With the postulation that these values are applicable in the corresponding stages in polymerization in this Example A41, the final proportions and compositions were calculated therefrom. Measurement of composition was conducted according to carbon 13 NMR.

Example B41

A pressure kneader for rubber of one liter capacity was set at a temperature of 190° C., and 90 parts of the block copolymer of Example A41 and 10 parts of a liquid polybutadiene ("NISSO PB B-3000", produced by Nippon Soda Co., Japan) as crosslinking aid were charged thereinto. After fusion kneading for 3 minutes, 0.5 part of a peroxide ("Percadox", produced by Kayaku Nuily Co., Japan) as a crosslinking agent and 0.05 part of dibenzothiazole disulfide as a crosslinking retarder were added to the mixture, after which fusion kneading was resumed for 10 minutes to carry out crosslinking treatment of the block copolymer.

The results of evaluation of physical properties of the product are shown in Table 8.

Example A42

After the same stainless-steel reactor as that used in Example A41 had been internally replaced thoroughly with propylene gas, 3.5 liters of n-heptane was charged as a polymerization solvent into the reactor. While the temperature in the reactor was kept at 20° C., 1.2 g of diethylaluminum chloride (DEAC) and 0.4 g of titanium trichloride (THB-19, produced by Marubeni Solvay Kagaku Co., Japan) were added to make up a catalyst.

The temperature in the reactor was set at 60° C., and propylene, ethylene and hydrogen were fed at rates of 240 g/hour, 9 g/hour and 4.8 liter (calculated at STP)/hour, respectively, over 2 hours and 30 minutes. After the feeding was stopped, gases in the reactor were purged until the inner pressure became 0.4 Kg/cm² (gauge). (Preparation of Block A; propylene/ethylene copolymerization.)

As the next step, while the inner temperature was set at 65° C., ethylene and propylene were fed at rates of 60 g/hour and 60 g/hour, respectively, over 2 hours and 30 minutes. During this reaction, the temperature in the reactor was kept at 65° C., and no hydrogen was fed. (Preparation of Block B; ethylene/propylene block copolymerization.)

The resultant block copolymer was purified with alcohol and dried.

The results are shown in Table 7.

Example B42

Crosslinking treatment was carried out under the conditions in Example B41 except that the copolymer of Example A42 was employed as the starting material.

The results are shown in Table 8.

Example A43

A block copolymer was prepared under the conditions in Example A42 except that in the preparation of Block A, ethylene was fed 20 minutes after commencement of the feeding of propylene at a rate of 10 g/hour, and the feeding rate of hydrogen was changed to 5.0 liter (calculated at STP)/hour, and that in the preparation of Block B, propylene was fed at a rate of 60 g/hour.

The results are shown in Table 7.

Example B43

Crosslinking treatment was carried out under the conditions in Examples B41 except that the 93 parts of block copolymer of Example A43 was employed as the starting material, and 7 parts of p,p'-dibenzoyl-quinonedioxime ("Acter DQ", produced by Kawaguchi Kagaku Kogyo Co., Japan) was charged as a crosslinking aid in place of the liquid 1,2-polybutadiene.

Example A44

A block copolymer was prepared under the conditions in Example A42 except that butene-1 was used in place of ethylene and fed at a rate of 100 g/hour, and the feeding rate of hydrogen was changed to 4.5 liter/hour.

The results are shown in Table 7.

Example B44

Crosslinking treatment was carried out under the conditions in Example B43 except that the copolymer of Example A44 was employed as the starting material.

The results are shown in Table 8.

Example A45

Block copolymerization was conducted under the conditions in Example A43 except that in the preparation of Block A, butene-1 was used in place of ethylene and fed at a rate of 120 g/hour, and that in the preparation of Block B, ethylene and propylene were fed over 2 hours and 45 minutes.

The results are shown in Table 7.

Example B45

Crosslinking treatment was carried out under the conditions in Example B41 except that the copolymer of Example A45 was employed as the starting material.

The results are shown in Table 8.

Comparative Example a41

Block copolymerization was conducted under the conditions in Example A44 except that the amount of n-heptane was changed to 4.5 liter, that during the preparation of Block A, propylene, butene-1 and hydrogen were fed at rates of 180 g/liter, 190 g/liter and 2 liter (calculated at STP)/hour, respectively, over 3 hours, and that during the preparation of Block B, ethylene and propylene were fed over 2 hours and 45 minutes.

The results are shown in Table 7.

Comparative Example b41

Crosslinking treatment was carried out under the conditions in Example B44 except that the copolymer of Comparative Example a41 was employed as the starting material.

The results are shown in Table 8.

TABLE 7

| | | Example | | | | | Com. |
|---|---|---|---|---|---|---|---|
| | | Ex. A41 | Ex. A42 | Ex. A43 | Ex. A44 | Ex. A45 | Ex. a41 |
| Block A | Content (wt. %) | 54.3 | 58.7 | 53.6 | 60.3 | 55.1 | 62.1 |
| | MFR (g/10 min.) | 71.4 | 66.2 | 76.1 | 67.3 | 72.6 | 66.4 |
| | Propylene content (wt. %) | 100 | 95.9 | 95.5 | 81.2 | 79.6 | 58.7 |
| | Ethylene or butene-1 content (wt. %) | — | ethylene 4.1 | ethylene 4.5 | butene-1 18.8 | butene-1 20.4 | butene-1 41.3 |
| Block B | Content (wt. %) | 45.7 | 41.3 | 46.4 | 39.7 | 44.9 | 37.9 |
| | Ethylene content (wt. %) | 51.7 | 59.8 | 50.8 | 58.7 | 51.3 | 59.8 |
| | Propylene content (wt. %) | 48.3 | 40.2 | 49.2 | 41.3 | 48.7 | 40.2 |
| Final Block Copolymer | MFR (g/10 min.) | 1.6 | 1.1 | 1.5 | 1.2 | 0.9 | 1.6 |
| | Propylene content (wt. %) | 76.4 | 72.9 | 74.0 | 76.7 | 65.8 | 51.8 |
| | Ethylene content (wt. %) | 23.6 | 27.1 | 26.0 | 23.3 | 23.0 | 22.7 |
| | Butene-1 content (wt. %) | — | — | — | 11.3 | 11.2 | 25.5 |

TABLE 8

| | | Example | | | | | Com. |
|---|---|---|---|---|---|---|---|
| | | Ex. B41 | Ex. B42 | Ex. B43 | Ex. B44 | Ex. B45 | Ex. b41 |
| Recipe | Starting copolymer (wt. parts) | Ex. A41 90 | Ex. A42 90 | Ex. A43 93 | Ex. A44 93 | Ex. A45 90 | Com. Ex. a41 90 |
| | Peroxide*1 (wt. parts) | 0.5 | 0.5 | 0.5 | 0.5 | 0.5 | 0.5 |
| | Crosslinking aid*2 | b | b | c | c | b | c |
| | (wt. parts) | 10 | 10 | 7 | 7 | 10 | 7 |
| | Crosslinking retarder*3 (wt. parts) | 0.05 | 0.05 | 0.05 | 0.05 | 0.05 | 0.05 |
| Physical Properties of Crosslinked Products | Gel content (wt. %) | 33.4 | 29.1 | 31.9 | 31.2 | 33.2 | 28.1 |
| | Fluidity ($\times 10^{-3}$ cc/sec.) | 96 | 104 | 98 | 97 | 96 | 120 |
| | Deformation under heating pressurization (%) | 1.1 | 1.3 | 1.2 | 1.4 | 1.3 | 41.4 |
| | Olsen flexural modulus (Kg/cm$^2$) | 3010 | 2870 | 2840 | 2920 | 2780 | 1100 |
| | Tensile strength at rupture (Kg/cm$^2$) | 181 | 172 | 164 | 173 | 185 | 61 |
| | $-40°$ C. Charpy impact | NB*4 | NB | NB | NB | NB | NB |

TABLE 8-continued

|  | Example |  |  |  |  |  |
|---|---|---|---|---|---|---|
|  | Ex. B41 | Ex. B42 | Ex. B43 | Ex. B44 | Ex. B45 | Com. Ex. b41 |
| strength (Kg-cm/cm²) |  |  |  |  |  |  |

*[1]"Percadox 14" produced by Kayaku Nuily Co., Japan.
*[2]b: 1,2-polybutadiene "NISSO PB B-3000" produced by Nippon Soda Co., Japan.
c: p,p'-dibenzoylquinonedioxime "Acter DQ" produced by Kawaguchi Kagaku Kogyo Co., Japan.
*[3]dibenzothiazole disulfide
*[4]NB indicates that sample was not broken.

What is claimed is:

1. A crosslinked product of an olefinic block copolymer, said crosslinked product being characterized by being derived from an olefinic block copolymer comprising 5 to 70 parts by weight of at least one block (A), which is selected from homopolymer blocks of propylene and random copolymer blocks of propylene and ethylene or a $C_{4-12}$ α-olefin and has a propylene content of 60 to 100% by weight, and 30 to 95 parts by weight of at least one block (B), which is a random copolymer of ethylene and at least one $C_{3-12}$ α-olefin and has an ethylene content of 10 to 85% by weight, and being characterized in that:

(1) the content therein of hot xylene insoluble components is from 5 to 75% by weight; and
(2) the fluidity thereof, which is, the quantity thereof flowing per second (cc/sec. $\times 10^{-3}$) out through the orifice of Koka flow tester, is 3 to 500 cc/sec. $\times 10^{-3}$ when measured by said flow tester having a cylinder diameter of 10 mm, an orifice diameter of 1 mm, and an orifice height of 2 mm and operated with a load of 30 Kg and a temperature of said crosslinked product of 200° C.

2. A crosslinked product of an olefinic copolymer according to claim 1, which product is derived from an olefinic copolymer, comprising 10 to 65 parts by weight of at least one block (A), which is selected from homopolymer blocks of propylene and random copolymer blocks of propylene and ethylene or a $C_{4-12}$ α-olefin and contains 70 to 100% by weight of propylene, and 35 to 90 parts by weight of at least one block (B), which is a random copolymer of ethylene and a $C_{3-12}$ α-olefin and contains 15 to 85% by weight of ethylene.

3. A crosslinked product of an olefinic copolymer according to claim 1, which product is derived from an olefinic copolymer, comprising 5 to less than 50 parts by weight of at least one block (A), which is selected from homopolymer blocks of propylene and binary random copolymer blocks of propylene and ethylene or a $C_{4-12}$ α-olefin and contains 60 to 100% by weight of propylene, and more than 50 to 95 parts by weight of at least one block (B), which is a binary or ternary copolymer of ethylene and a $C_{4-12}$ α-olefin optionally with propylene and contains more than 30 to 85% by weight of ethylene.

4. A crosslinked product of an olefinic block copolymer, said crosslinked product being characterized by being derived from an olefinic block copolymer comprising 5 to 50 parts by weight of at least one block (A), which is selected from homopolymer blocks of propylene and random copolymer blocks of propylene and ethylene or a $C_{4-12}$ α-olefin and has a propylene content of 100 to 60% by weight, and 95 to 50 parts by weight of at least one block (B), which is a binary random copolymer of ethylene and propylene and has an ethylene content of 30 to 85% by weight, and being characterized in that:

(1) the content therein of hot xylene insoluble components is from 5 to 75% by weight; and
(2) the fluidity thereof, which is the quantity thereof flowing per second (cc/sec. $\times 10^{-3}$) out through the orifice of Koka flow tester, is 3 to 500 cc/sec. $\times 10^{-3}$ when measured by said flow tester having a cylinder diameter of 10 mm, an orifice diameter of 1 mm, and an orifice height of 2 mm and operated with a load of 30 Kg and a temperature of said crosslinked product of 200° C.

5. A crosslinked product of an olefinic block copolymer, said crosslinked product being characterized by being derived from an olefinic block copolymer comprising 5 to 70 parts by weight of a block (A), which is selected from homopolymer blocks of propylene and binary or ternary random copolymer blocks of propylene and ethylene and/or butene-1 containing 70 to 100% by weight of propylene, 0 to 8% by weight of ethylene, and 0 to 30% by weight of butene-1, and 30 to 95 parts by weight of a block (B), which is a ternary random copolymer comprising 0 to 85% by weight of butene-1, 5 to 90% by weight of propylene, and 10 to 30% by weight of ethylene, and being characterized in that:

(1) the content therein of hot xylene insoluble components is from 5 to 75% by weight; and
(2) the fluidity thereof, which is the quantity thereof flowing per second (cc/sec. $\times 10^{-3}$) out through the orifice of a high-shear stress type flow tester, is 3 to 500 cc/sec. $\times 10^{-3}$ when measured by said flow tester having a cylinder diameter of 10 mm, an orifice diameter of 1 mm, and an orifice height of 2 mm and operated with a load of 30 Kg and a temperature of said crosslinked product of 200° C.

6. A crosslinked product of an olefinic block copolymer, said crosslinked product being characterized by being derived from an olefinic block copolymer comprising 50 to 70 by weight of at least one block (A), which is selected from homopolymer blocks of propylene and binary random copolymer blocks of propylene and ethylene or a $C_{4-12}$ α-olefin and contains 100 to 60% by weight of propylene, and 30 to 50 parts by weight of at least one block (B), which is a binary random copolymer of ethylene and propylene and contains 30 to 85% by weight of ethylene, and being characterized in that:

(1) the content therein of hot xylene insoluble components is from 5 to 50% by weight; and
(2) the fluidity thereof, which is the quantity thereof flowing per second (cc/sec. $\times 10^{-3}$) out through the orifice of a high-shear stress type flow tester, is 3 to 500 cc/sec. $\times 10^{-3}$ when measured by said flow tester having a cylinder diameter of 10 mm, an orifice diameter of 1 mm, and an orifice height of 2 mm and operated with a load of 30 Kg and a temperature of said crosslinked product of 200° C.

7. A crosslinked product of an olefinic block copolymer according to claim 1, which is derived from an olefinic copolymer, comprising 50 to 70 parts by weight of at least one block (A), which is selected from homopolymer blocks of propylene and random copolymer blocks of propylene and ethylene or a $C_{4-12}$ α-olefin and contains 60 to 100% by weight of propylene, and 30 to 50 parts by weight of at least one block (B), which is a binary or ternary copolymer of ethylene and a $C_{4-12}$ α-olefin optionally with propylene and contains 30 to 85% by weight of ethylene.

* * * * *